United States Patent
Chatziioannou

(10) Patent No.: US 12,271,277 B2
(45) Date of Patent: Apr. 8, 2025

(54) METHOD OF CONTROLLING COMMUNICATION OVER A LOCAL INTERCONNECT NETWORK BUS

(71) Applicant: Volvo Car Corporation, Gothenburg (SE)

(72) Inventor: Kostas Chatziioannou, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 677 days.

(21) Appl. No.: 16/897,353

(22) Filed: Jun. 10, 2020

(65) Prior Publication Data

US 2021/0004304 A1 Jan. 7, 2021

(30) Foreign Application Priority Data

Jul. 1, 2019 (EP) ................................ 19183693

(51) Int. Cl.
- *G06F 11/20* (2006.01)
- *G06F 1/3215* (2019.01)
- *H04L 12/40* (2006.01)

(52) U.S. Cl.
CPC ........ *G06F 11/2033* (2013.01); *G06F 1/3215* (2013.01); *G06F 2201/85* (2013.01); *H04L 2012/40215* (2013.01); *H04L 2012/40234* (2013.01)

(58) Field of Classification Search
None
See application file for complete search history.

(56) References Cited

U.S. PATENT DOCUMENTS

| | | | | |
|---|---|---|---|---|
| 9,501,440 B2* | 11/2016 | Odenbreit | ............. | G06F 9/4881 |
| 2003/0091051 A1* | 5/2003 | Novick | ............. | H04L 12/40202 370/421 |
| 2006/0116803 A1* | 6/2006 | Armbruster | ......... | G06F 11/2038 701/1 |
| 2008/0276107 A1* | 11/2008 | Bogavac | ................. | H04L 12/12 713/323 |
| 2010/0146174 A1* | 6/2010 | Djordjevic | ............ | H04L 63/126 710/110 |
| 2012/0030330 A1* | 2/2012 | Rocher | ............. | H04L 12/40039 709/223 |

(Continued)

FOREIGN PATENT DOCUMENTS

| | | |
|---|---|---|
| DE | 102005008556 A1 | 8/2006 |
| JP | 5252374 B2 | 7/2013 |
| KR | 200329874 Y1 | 10/2003 |

OTHER PUBLICATIONS

Dec. 9, 2019 European Search Report issue on International Application No. EP19183693.

*Primary Examiner* — Gregory B Sefcheck
*Assistant Examiner* — Suk Jin Kang
(74) *Attorney, Agent, or Firm* — Clements Bernard Walker; Christopher L. Bernard

(57) ABSTRACT

A method of controlling communication over a Local Interconnect Network (LIN) bus is provided. The method comprises a redundancy master node detecting whether or not a first master node responds to data transmitted over the LIN bus; wherein in case the first master node does not respond, the redundancy master node will act as master node on the LIN bus.

9 Claims, 9 Drawing Sheets

(56) References Cited

U.S. PATENT DOCUMENTS

| | | | |
|---|---|---|---|
| 2013/0007319 A1* | 1/2013 | Decker | G06F 11/2005 710/110 |
| 2013/0067129 A1* | 3/2013 | Kashima | G06F 13/4286 710/110 |
| 2013/0211552 A1* | 8/2013 | Gomez | G05B 11/01 700/20 |
| 2013/0274897 A1* | 10/2013 | Herthan | H04L 12/403 700/3 |
| 2014/0223048 A1* | 8/2014 | Troeger | G06F 13/4286 710/106 |
| 2015/0200789 A1* | 7/2015 | Jiang | H04L 12/403 370/463 |
| 2015/0356043 A1* | 12/2015 | Hasse | G06F 13/4022 710/110 |
| 2016/0027750 A1* | 1/2016 | Kuo | H01L 25/0657 257/737 |
| 2016/0056973 A9* | 2/2016 | Jiang | H04L 12/40032 370/463 |
| 2016/0173294 A1* | 6/2016 | Kim | H04L 43/0817 370/245 |
| 2016/0173335 A1* | 6/2016 | Edmiston | H04L 12/40202 370/254 |
| 2016/0292106 A1* | 10/2016 | Spiegel | H04L 12/40202 |
| 2018/0212822 A1* | 7/2018 | Ikeda | H04L 41/082 |
| 2018/0295011 A1* | 10/2018 | Wang | H04L 41/0833 |
| 2019/0391953 A1* | 12/2019 | Suzuki | G06F 13/4018 |
| 2020/0162283 A1* | 5/2020 | Mo | H04L 43/10 |
| 2020/0295957 A1* | 9/2020 | Kim | H04L 67/145 |
| 2020/0343993 A1* | 10/2020 | Rentschler | H04L 12/413 |
| 2020/0393891 A1* | 12/2020 | Baggett | H04L 12/12 |
| 2021/0144068 A1* | 5/2021 | Mo | H04L 41/16 |
| 2021/0152391 A1* | 5/2021 | Mo | H04L 41/0663 |
| 2021/0279331 A1* | 9/2021 | Gilad | G06F 21/556 |
| 2021/0366215 A1* | 11/2021 | Ellis | G07C 9/00309 |
| 2022/0209986 A1* | 6/2022 | Mutter | H04L 12/4015 |
| 2022/0368451 A1* | 11/2022 | Rentschler | H04L 41/0816 |
| 2024/0031181 A1* | 1/2024 | Baggett | H04L 12/12 |

* cited by examiner

METHOD OF CONTROLLING COMMUNICATION OVER A LOCAL INTERCONNECT NETWORK BUS

CROSS-REFERENCE TO RELATED APPLICATION

The present disclosure claims the benefit of priority of co-pending European Patent Application No. 19183693.1, filed on Jul. 1, 2019, and entitled "METHOD OF CONTROLLING COMMUNICATION OVER A LOCAL INTERCONNECT NETWORK BUS," the contents of which are incorporated in full by reference herein.

TECHNICAL FIELD

The present disclosure relates to a method of controlling communication over a Local Interconnect Network (LIN) bus, and a device performing the method.

BACKGROUND

The automotive industry is using a serial network protocol known as Local Interconnect Network (LIN) for communication between components in a motor vehicle.

Typically, a master node in the form of an electronic control unit (ECU) embedded in a motor vehicle communicates over a LIN bus with up to 16 slave nodes providing various functionality in the motor vehicle relating to for instance locks, brakes, lighting, battery, etc.

However, if the ECU master node fails, it is not possible to provide the functionality of the slave nodes, since all communication over the LIN bus is initiated by the master node.

SUMMARY

An objective is to solve, or at least mitigate, this problem and to provide an improved method of controlling communication over a LIN bus.

In an embodiment, a redundancy master node is connected to a LIN bus, which monitors communication on the LIN bus. If a first "regular" master node does not respond to data being transmitted over the LIN bus, the first ECU master node is assumed to not function correctly, in which case the redundancy ECU master node will act as master node on the LIN bus. In contrast, if the first ECU master node responds to data being transferred over the LIN bus, the redundancy ECU master node will remain silent, as the first ECU master node 201b indeed appears to function correctly.

Advantageously, with this embodiment, in case the regular master node fails, the redundancy ECU master node will assume the role of master node on the LIN bus. Thereby, redundancy is provided for, and the LIN network will function seamlessly even if one master node suffers from a failure.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
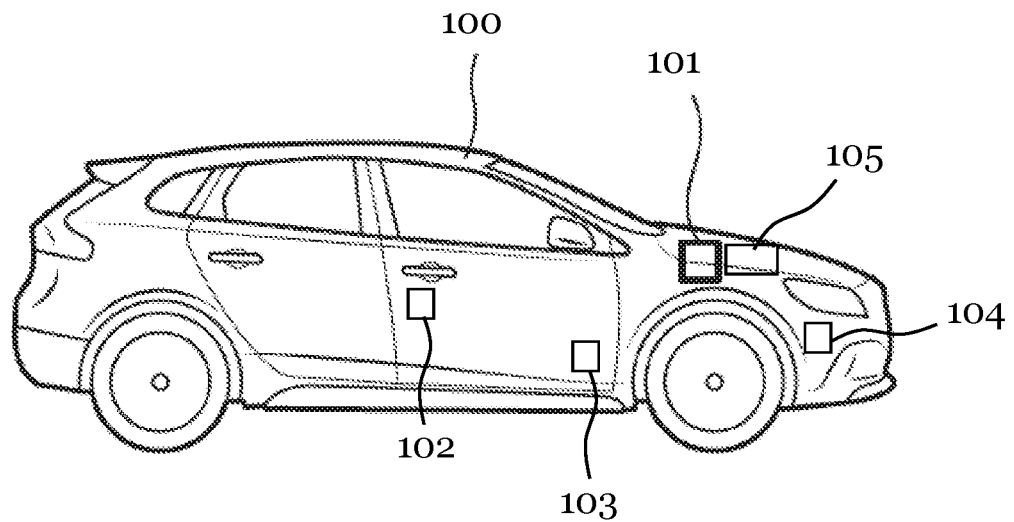
FIG. 1 illustrates a motor vehicle comprising an ECU controlling a plurality of components.

FIG. 1 illustrates a motor vehicle 100 in the form of car. The vehicle 100 is typically equipped with an Electronic Control Unit (ECU, 101), which may be implemented by one or more microprocessors executing appropriate software for controlling various systems and components in the vehicle. A car may contain a number of interconnected ECUs for controlling all properties of the car, thereby providing for instance a brake control module (BCM), a speed control module (SCM) or a battery management system (BMS).

The ECU 101 is interconnected with various components via a LIN bus, such as components providing functionality relating to locks 102, brakes 103, lighting 104, battery 105, etc. Each component may have its own ECU (or similar device) controlling the associated component and communicating over the LIN bus with the "master" ECU 101. For instance, the lock module 102 is typically a mechanical device for physically locking/unlocking one or more doors of the car, which mechanical lock module is connected to an ECU-type device, i.e. a lock control module, from which it receives signals for a door to lock/unlock, while e.g. brake functionality generally is controlled by the BCS and battery functionality it controlled by the BMS.

The ECU 101 may further by equipped with an interface for wireless transmission of data, for instance for wireless communication of various parameters and data and/or measured properties of the vehicle 100 to a remote location.

Individual components may also be equipped with an interface for wireless transmission of data. For instance, the lock module 102 (or a node in communication with the lock module) may be equipped with a Bluetooth or Near-Field Communication (NFC) interface for wireless communication with a car key, a smart phone or an NFC card to allow a user to lock/unlock the vehicle 100.

Figure 2:
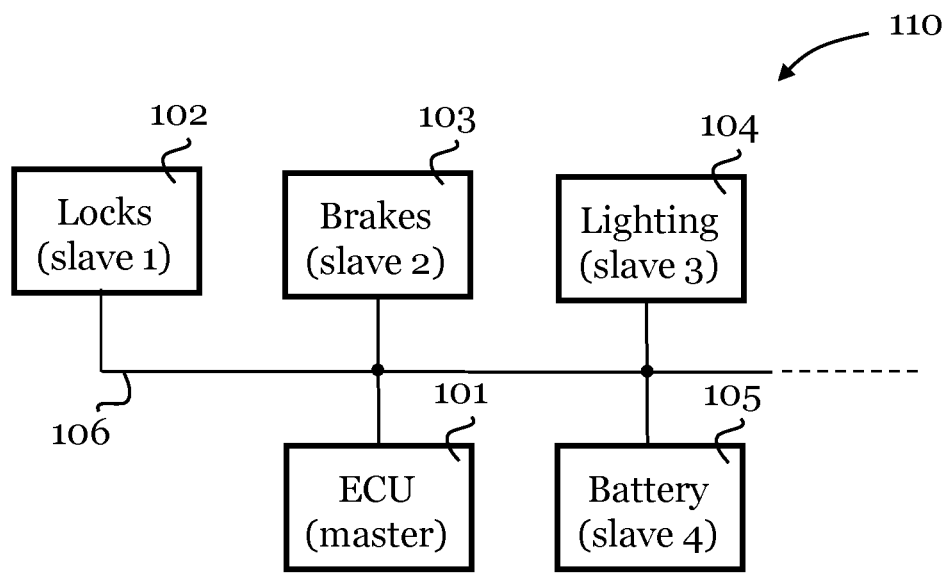
FIG. 2 illustrates a prior art LIN network.

FIG. 2 illustrates a LIN network 110 formed by a master node—the ECU 101—and four slave nodes—the locks 102, brakes 103, lighting 104 and battery 105—all interconnected via a LIN bus 106.

Now, in a prior art LIN network no as that shown in FIG. 2, only one master node is allowed to be connected to the LIN bus 106. All messages sent over the LIN bus 106 are initiated by the master node with at most one slave node replying to a message identifier addressing a particular slave node on the bus. The master node can also act as a slave node by replying to its own messages.

The LIN protocol specifies a sleep-mode and an active mode bus state, where all LIN nodes are requested to be in active state if data is on the bus. After a specified timeout, the nodes enter sleep mode and will be released back to active state by a wakeup frame. This frame may be sent by any node requesting activity on the bus, either the LIN Master following its internal schedule, or one of the attached LIN Slaves being activated by its internal software application. After all nodes are awakened, the master node continues to schedule data on the bus.

However, if the ECU master node 101 fails, it is not possible to provide the functionality of the slave nodes 102-105, since all communication over the LIN bus 106 is initiated by the master node 101.

This is problematic since, for instance, assuming that a user wants to unlock the vehicle by sweeping her NFC-capable car key over the lock module 102. The lock module 102 will thus, after having received a message from the ECU 101 addressing the lock module 102 thereby allowing the lock module 102 to use the bus 106, transmit a message to the ECU 101 over the LIN bus 106 asking the ECU 101 to authenticate credentials transmitted over the NFC interface by the car key.

If the ECU 101 can verify the correctness of the credentials, a message is transmitted over the LIN bus 106 to the lock module 102 which accordingly will unlock the doors of the vehicle 100.

However, if the ECU 101 for some reason does not function correctly, a lock control module controlling the lock module 102 will not receive the message that the credentials are authenticated. This will have as a consequence that the user cannot unlock the vehicle 100.

This is solved in an embodiment illustrated with reference to FIG. 3 where the vehicle 100 is illustrated to comprise a LIN network formed by a first master node—a first ECU 201a—and four slave nodes—lock control module 202, brake control module 203, lighting control module 204 and battery control module 205—and further a redundancy master node in the form of a second ECU 201b all interconnected via a LIN bus.

Figure 3:
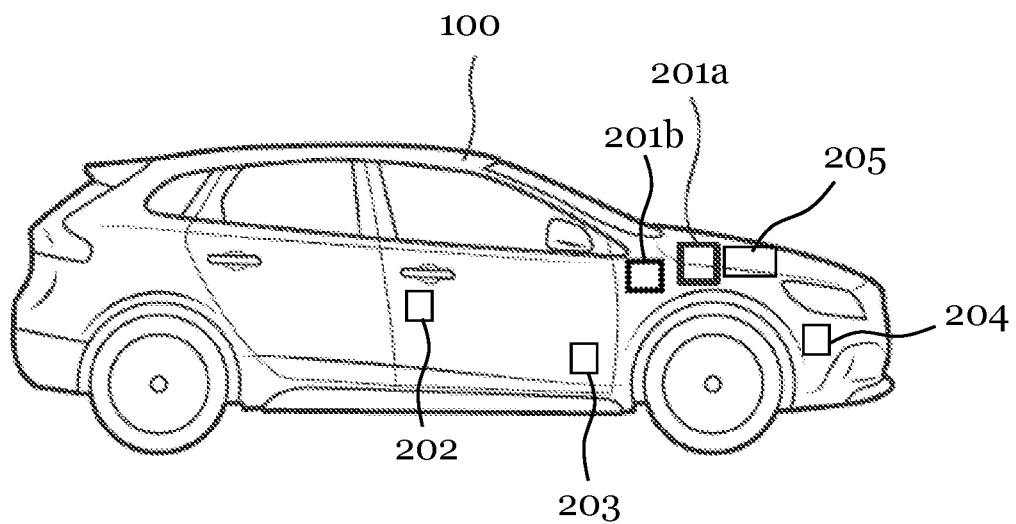
FIG. 3 illustrates a motor vehicle comprising a plurality of ECU master nodes according to an embodiment.
Figure 4:
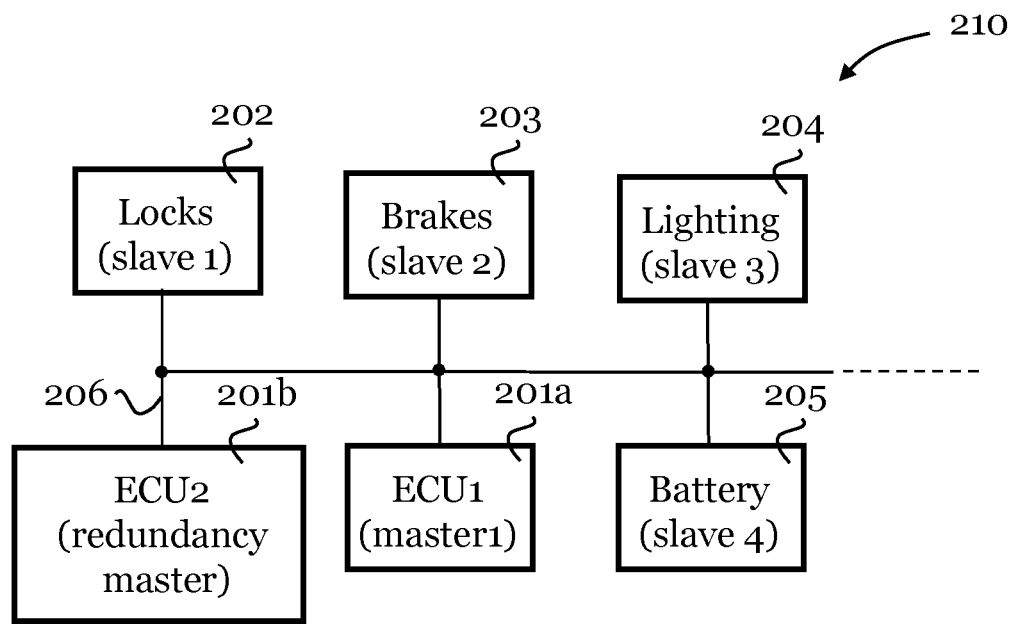
FIG. 4 illustrates a LIN network according to an embodiment.

FIG. 4 illustrates the LIN network 210 implemented in the vehicle 100 of FIG. 3 comprising the first ECU master node 210a, the redundancy ECU master node 201b and the four slave nodes; the lock control module 202, brake control module 203, lighting control module 204 and battery control module 205, all interconnected via a LIN bus 206.

Now, to comply with LIN network requirements, a collision avoidance mechanism is required if a redundancy ECU master node 201b is to be connected to the LIN bus 206 for possibly taking over the role as master node from the first ECU master node 201a.

Figure 5:
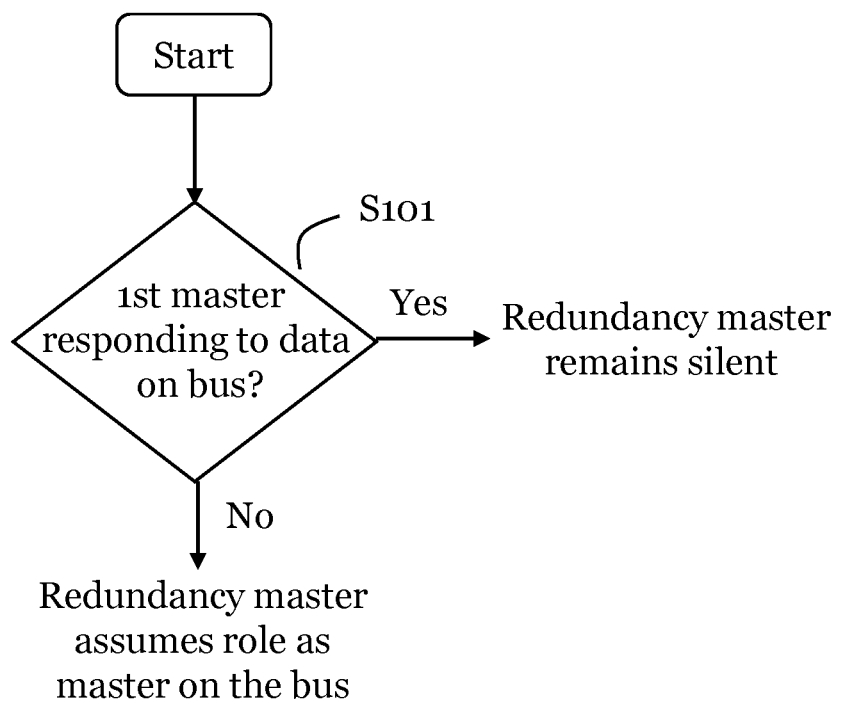
FIG. 5 shows a flowchart illustrating a method of controlling communication over a LIN bus according to an embodiment.

FIG. 5 shows a flowchart illustrating a method of controlling communication over the LIN bus 206 to which the redundancy LIN master node 201b is connected.

It is to be noted that the two nodes 201a, 201b never will act as master nodes simultaneously but are used for redundancy purposes; either the one or the other will assume the role of a master node.

Now, in a first step S101, the redundancy ECU master node 201b, will monitor communication on the LIN bus 206. If the first ECU master node 201a does not respond to data being transmitted over the LIN bus 206, the first ECU master node 201a is assumed to not function correctly, in which case the redundancy ECU master node 201b will act as a single master node on the LIN bus 206. In contrast, if the first ECU master node 201a responds to data being transferred over the LIN bus 206, the redundancy ECU master node 201b will remain silent, as the first ECU master node 201b indeed appears to function correctly. As an alternative to remaining silent, the redundancy ECU master node 201b may act as a slave node on the LIN bus 206.

Advantageously, with this embodiment, in case the "regular" master node fails—i.e. the first ECU master node 201a—the redundancy ECU master node 201b will assume the role of single master node on the LIN bus 206. Thereby, redundancy is provided for, and the LIN network 210 will function seamlessly even if one master node suffers from a failure.

The LIN protocol is well-known and will thus not be described in any detail herein. However, the master node transmits a header consisting of a break signal followed by synchronization and identifier fields uniquely addressing each slave node on the LIN bus 206. The slave nodes respond with a data frame that consists of between 2, 4 and 8 data bytes plus 3 bytes of control information.

Figure 6:
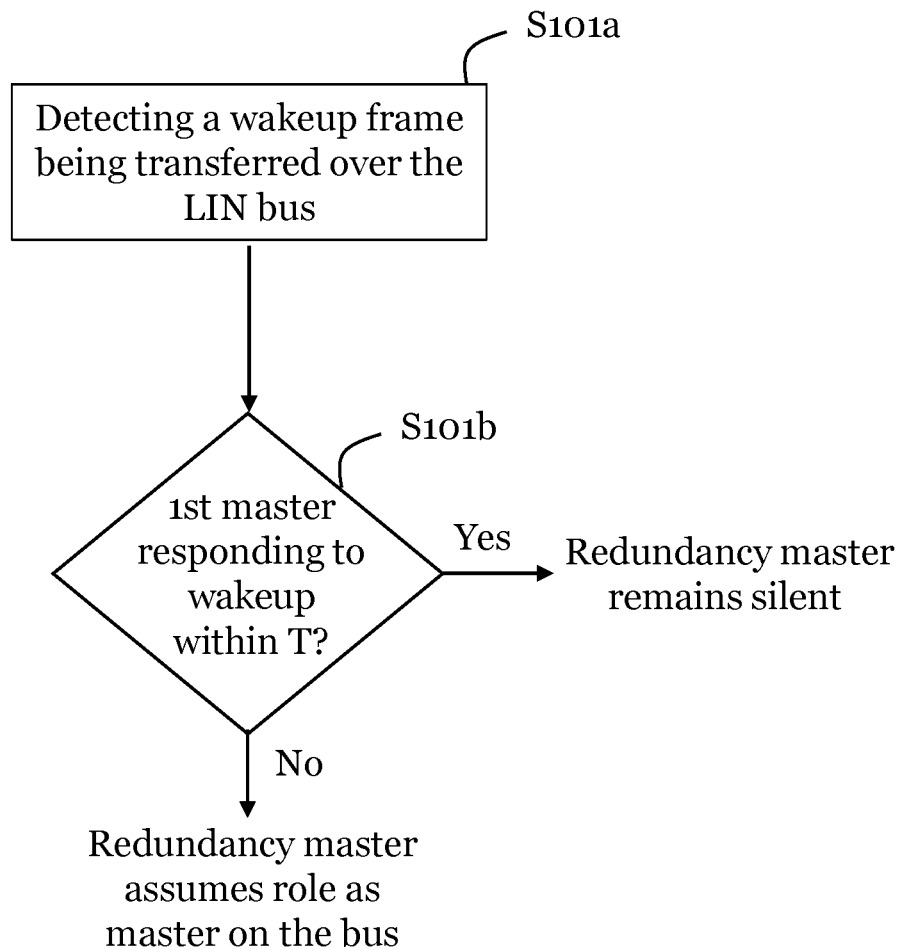
FIG. 6 shows a flowchart illustrating a method of controlling communication over the LIN bus according to a further embodiment.

FIG. 6 shows a flowchart illustrating a method of controlling communication over the LIN bus 206 according to an embodiment where the redundancy ECU master node 201b detects in step S101a if a wakeup frame is transferred over the LIN bus 206. This wakeup frame may be issued by any one of the nodes connected to the LIN bus 206.

In the LIN protocol, all nodes should wakeup within 100 ms from the end of the wakeup frame. The first master node Zola must transmit data over the LIN bus 206 within 150 ms from the end of the wakeup frame. Hence, regardless of whether any of the slave nodes 202-205 issues the wakeup frame or the first ECU master node Zola itself issues the wakeup frame, the first ECU master node Zola must respond to the issued wakeup frame by transmitting data over the LIN bus within 150 ms.

The redundancy ECU master node 201b then detects in step S101b whether the first ECU master node Zola responds to the wakeup frame within a set time period T, preferably being 150 ms to comply with the LIN protocol even though other timings may be envisaged.

In case no response is detected from the first ECU master node Zola on the LIN bus 206 within the exemplified set time period T=150 ms, the redundancy ECU master node 201b will act as a single master node on the LIN bus. In case a reply indeed is received within the set time period T, the redundancy ECU master node 201b will not act as the master node on the LIN bus 206 and accordingly remain silent and not transmit data over the LIN bus 206 since the first ECU master node 201a will continue to assume the role as the single master node on the LIN bus 206.

In an embodiment, the redundancy ECU master node 201*b* assumes the role as the master node on the LIN bus 206 during a current, ongoing LIN bus communication cycle. After the nodes again go into sleep state and subsequently wake up, the redundancy ECU master node 201*b* will again perform steps S101*a* and S101*b* for detecting whether the first ECU master node 201*a* functions as expected or not.

Hence, the redundancy ECU master node 201*b* acts as the master node for a current LIN bus communication cycle and again detects whether or not the first ECU master node 201*a* responds to a next issued wakeup frame within the set time period T. As long as the first ECU master node 201*a* does not signal that it is capable of acting as master node on the LIN bus 206, the redundancy ECU master node 201*b* will assume the responsibility as master node.

Figure 7:
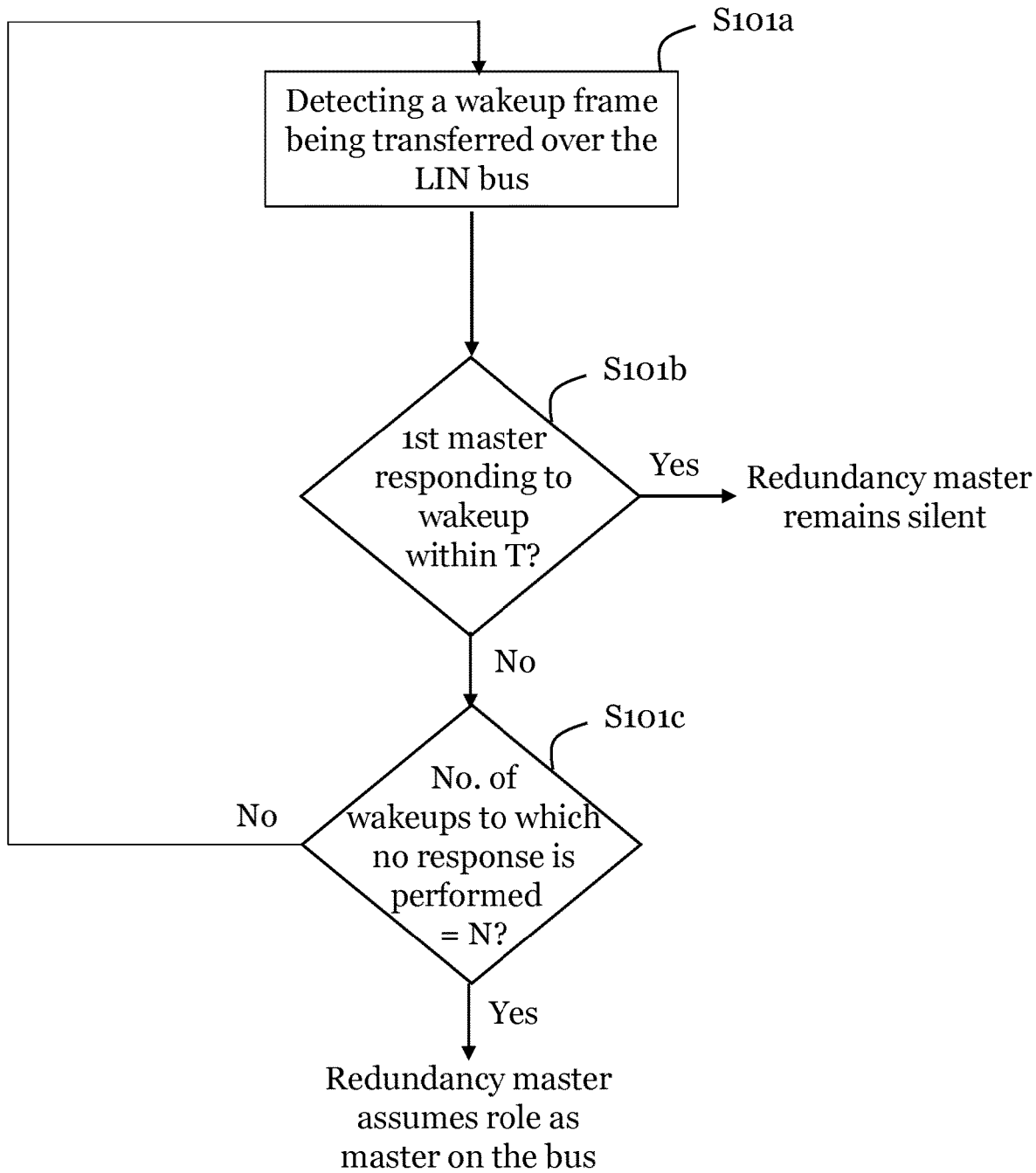
FIG. 7 shows a flowchart illustrating a method of controlling communication over the LIN bus 206 according to still a further embodiment.

FIG. 7 shows a flowchart illustrating a method of controlling communication over the LIN bus 206 according to an embodiment where the first ECU master node 201*a* must fail to respond within the set time period T=150 ms an issued wakeup frame for a set number N of consecutively issued wakeup frames. In the following example, N=$_3$.

As previously, in step S101*a*, the redundancy ECU master node 201*b* detects if a wakeup frame is being transferred over the LIN bus 206. The redundancy ECU master node 201*b* then detects in step S101*b* whether the first ECU master node 201*a* responds to the wakeup frame within the time period T=150 ms.

In case no response is detected from the first ECU master node 201*a* on the LIN bus 206 within the set time period T=150 ms, the redundancy ECU master node 201*b* detects in step S101*c* whether or not this is the third (N=$_3$) wakeup frame to which the first ECU mater node fails to respond within T=150 ms.

If so, the redundancy ECU master node 201*b* will act as master node on the LIN bus 206. In case N=3 has not yet been reached, the redundancy ECU master node 201*b* will detect a further wakeup frame to which the first ECU master node 201*a* fails to respond within T=150 ms. Should the first ECU master node 101*a* respond adequately before N=$_3$ is reached, the redundancy ECU master node 201*b* will remain silent on the LIN bus 206.

As in FIG. 6, if the first ECU master node 201*a* indeed responds within the set time period T in step S101*b*, the redundancy ECU master node 201*b* will not act as the master node on the LIN bus 206 and accordingly remain silent and not transmit data over the LIN bus 206 since the first ECU master node Zola will continue to assume the role as the single master node on the LIN bus 206.

Figure 8:
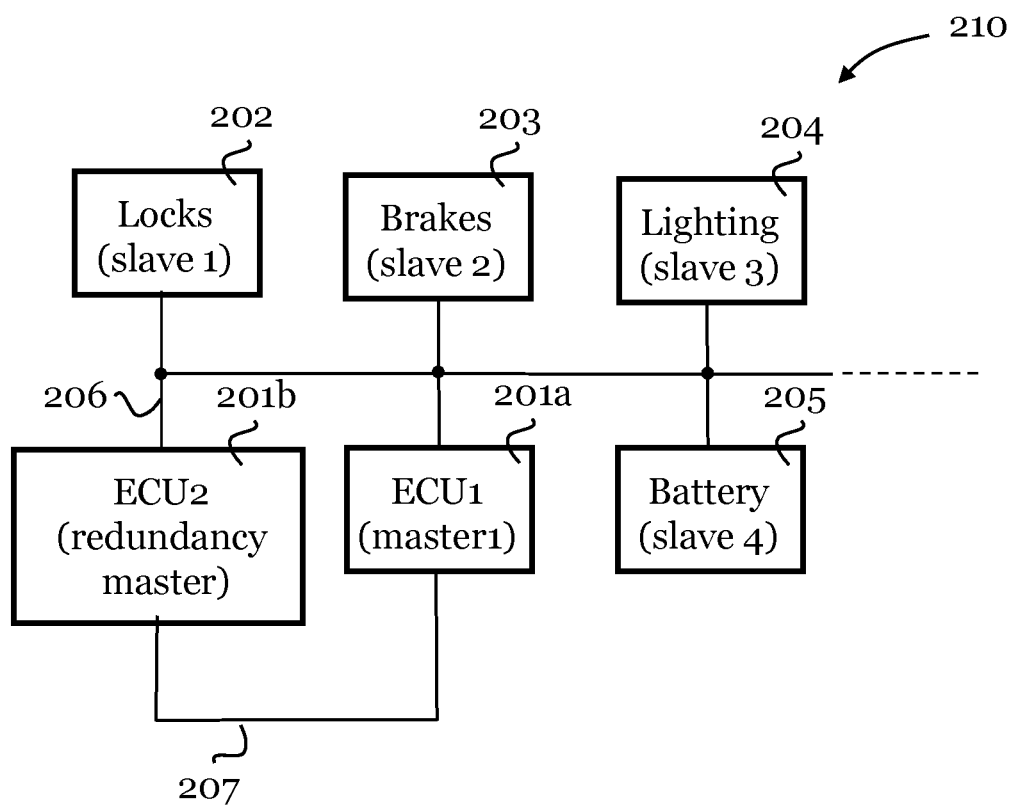
FIG. 8 illustrates a LIN network according to a further embodiment.

FIG. 8 illustrates the LIN network 210 of FIG. 4 but where the first ECU master node Zola and the redundancy ECU master node 201*b* is interconnected by means of a Controller Area Network (CAN) bus 207 according to an embodiment.

In this embodiment, the CAN bus 207 is used by the first ECU master node Zola to signal, after the redundancy ECU master node 201*b* has assumed responsibility as master node on the LIN bus 206, that the first ECU master node Zola is ready to resume the role as master node on the LIN bus 206. After the redundancy ECU master node 201*b* has received a message over the CAN bus 207 that the first ECU master node Zola is ready to again act as the master node on the LIN bus 206, the redundancy ECU master node 201*b* will revert to remaining silent on the LIN bus 206.

Figure 9:
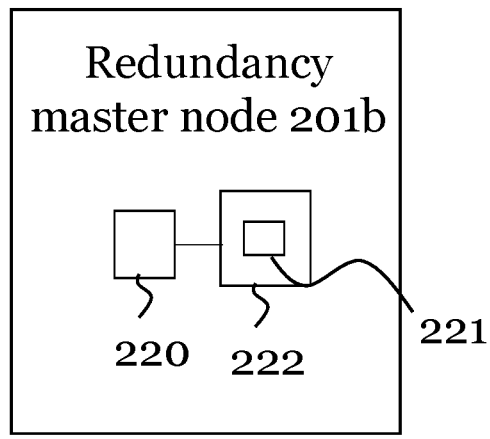
FIG. 9 illustrates a redundancy master node according to an embodiment.

FIG. 9 illustrates a redundancy master node 2*o*1*b* according to an embodiment. The steps of the method performed by the redundancy master node 201*b* of controlling communication over a LIN bus according to embodiments are in practice performed by a processing unit 220 embodied in the form of one or more microprocessors arranged to execute a computer program 221 downloaded to a suitable storage volatile medium 222 associated with the microprocessor, such as a Random Access Memory (RAM), or a non-volatile storage medium such as a Flash memory or a hard disk drive. The processing unit 220 is arranged to cause the redundancy master node 2*o*1*b* to carry out the method according to embodiments when the appropriate computer program 21 comprising computer-executable instructions is downloaded to the storage medium 222 and executed by the processing unit 220. The storage medium 222 may also be a computer program product comprising the computer program 221. Alternatively, the computer program 221 may be transferred to the storage medium 222 by means of a suitable computer program product, such as a Digital Versatile Disc (DVD) or a memory stick. As a further alternative, the computer program 221 may be downloaded to the storage medium 222 over a network. The processing unit 220 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of controlling communication over a Local Interconnect Network, LIN, bus, the method comprising:
   a redundancy master node detecting whether or not a first master node responds to data transmitted over the LIN bus; wherein in case the first master node does not respond, the redundancy master node acts as master node on the LIN bus;
   wherein the detecting comprises:
   detecting a wakeup LIN frame being transferred on the LIN bus by the first master node or a slave node, the wakeup LIN frame configured to transition any node on the LIN bus in a sleep state to an active state;
   detecting whether or not the first master node responds to the wakeup LIN frame within a set time period (T); wherein in case the first master node does not respond within the set time period (T), the redundancy master node acts as master node on the LIN bus during a current LIN bus communication cycle, until all nodes on the LIN bus go into a sleep state; and
   detecting whether or not the first master node has failed to respond to the wakeup LIN frame within a set time period (T) for a set number (N) of consecutive wakeup frames having been transferred on the LIN bus; wherein in case the set number (N) has been reached, the redundancy master node acts as master node on the LIN bus, and
   wherein the redundancy master node acts as master node during the current LIN bus communication cycle, until all the nodes on the LIN bus go into the sleep state, and again detects whether or not the first master node responds to a next issued wakeup LIN frame within the set time period (T) to determine whether to continue to act as master node on the LIN bus.

2. The method of claim 1, wherein in case the first master node responds to data transmitted over the LIN bus, the redundancy master node remains silent or acts as a slave node on the LIN bus.

3. The method of claim 1, wherein the first master node and the redundancy master node further are interconnected via a Controller Area Network, CAN, bus over which the redundancy master node receives a message from the first master node that the first master node is ready to resume a role as master node on the LIN bus.

4. A computer program product comprising a non-transitory computer readable medium, the non-transitory computer readable medium comprising computer-executable instructions for causing the redundancy master node to perform the steps recited in claim 1 when the computer-executable instructions are executed on a processing unit included in the redundancy master node.

5. A redundancy master node configured to control communication over a Local Interconnect Network, LIN, bus, the redundancy master node comprising a processing unit and a memory, said memory containing instructions executable by said processing unit, whereby the redundancy master node is operative to:
 detect whether or not a first master node responds to data transmitted over the LIN bus;
 wherein in case the first master node does not respond, the redundancy master node acts as master node on the LIN bus; and
 when detecting whether or not the first master node responds to data transmitted over the LIN bus:
 detect a wakeup LIN frame being transferred on the LIN bus by the first master node or a slave node, the wakeup LIN frame configured to transition any node on the LIN bus in a sleep state to an active state;
 detect whether or not the first master node responds to the wakeup LIN frame within a set time period (T); wherein in case the first master node does not respond within the set time period (T), the redundancy master node acts as master node on the LIN bus during a current LIN bus communication cycle, until all nodes on the LIN bus go into a sleep state; and
 detect whether or not the first master node has failed to respond to the wakeup LIN frame within a set time period (T) for a set number (N) of consecutive wakeup frames having been transferred on the LIN bus; wherein in case the set number (N) has been reached, the redundancy master node acts as master node on the LIN bus, and
 wherein the redundancy master node is operative to act as master node during the current LIN bus communication cycle, until all the nodes on the LIN bus go into the sleep state, and again detect whether or not the first master node responds to a next issued wakeup LIN frame within the set time period (T) to determine whether to continue to act as master node on the LIN bus.

6. The redundancy master node of claim 5, wherein in case the first master node responds to data transmitted over the LIN bus, the redundancy master node is operative to remain silent or act as a slave node on the LIN bus.

7. The redundancy master node of claim 5, wherein the first master node and the redundancy master node further are configured to be interconnected via a Controller Area Network, CAN, bus over which the redundancy master node is operative to receive a message from the first master node that first master node is ready to resume role as master node on the LIN bus.

8. A vehicle comprising a LIN network to which the redundancy master node of claim 5 is connected.

9. The method of claim 1, wherein the wakeup LIN frame transferred on the LIN bus comprises a 12 Volt signal communicated over a single wire.

* * * * *